(12) United States Patent
Chessher

(10) Patent No.: US 9,973,304 B2
(45) Date of Patent: May 15, 2018

(54) COMMUNICATION SIGNAL ISOLATION ON A MULTI-PORT DEVICE

(71) Applicant: ECHOSTAR TECHNOLOGIES L.L.C., Englewood, CO (US)

(72) Inventor: Brett Chessher, Littleton, CO (US)

(73) Assignee: ECHOSTAR TECHNOLOGIES LLC, Englewood, CO (US)

( * ) Notice: Subject to any disclaimer, the term of this patent is extended or adjusted under 35 U.S.C. 154(b) by 135 days.

(21) Appl. No.: 14/986,539

(22) Filed: Dec. 31, 2015

(65) Prior Publication Data

US 2016/0191211 A1 Jun. 30, 2016

Related U.S. Application Data

(60) Provisional application No. 62/098,980, filed on Dec. 31, 2014.

(51) Int. Cl.
| | |
|---|---|
| *H04L 12/28* | (2006.01) |
| *H04L 1/16* | (2006.01) |
| *H04L 29/08* | (2006.01) |
| *H04N 21/61* | (2011.01) |
| *H04B 3/32* | (2006.01) |
| *H04J 3/10* | (2006.01) |

(52) U.S. Cl.
CPC ............ *H04L 1/1685* (2013.01); *H04B 3/32* (2013.01); *H04L 67/146* (2013.01); *H04N 21/6143* (2013.01); *H04J 3/10* (2013.01)

(58) Field of Classification Search
CPC ............................ H04L 1/1685; H04L 67/146
USPC ........................................................ 370/442
See application file for complete search history.

(56) References Cited

U.S. PATENT DOCUMENTS

| | | | |
|---|---|---|---|
| 4,340,961 A | 7/1982 | Capel et al. | |
| 4,940,974 A | 7/1990 | Sojka | |
| 5,297,144 A | 3/1994 | Gilbert et al. | |
| 5,606,322 A | 2/1997 | Allen et al. .................. | 341/173 |

(Continued)

FOREIGN PATENT DOCUMENTS

| | | |
|---|---|---|
| WO | 1994005131 A1 | 3/1994 |
| WO | 1998054859 A1 | 12/1998 |
| WO | 2004032026 A1 | 4/2004 |

OTHER PUBLICATIONS

International Search Report and Written Opinion, International Application No. PCT/US2015/068240, dated Apr. 8, 2016.

(Continued)

*Primary Examiner* — Farah Faroul
(74) *Attorney, Agent, or Firm* — Lorenz & Kopf LLP

(57) ABSTRACT

Automated processes, devices and systems isolate signals received on first and second ports from each other using staggered time division multiple access (TDMA) schemes. Additionally or alternately, port and/or client identifiers can be included within communications propagating in multiple TDMA schemes, thereby allowing host and/or client devices to verify that communications are received on the intended ports. By logically isolating the communications of the multiple TDMA schemes and/or by providing identifying information within propagated communications, crosstalk between the two schemes can be substantially reduced or eliminated, often without substantial modifications to the hardware configuration of the system.

19 Claims, 3 Drawing Sheets

(56) References Cited

U.S. PATENT DOCUMENTS

Figure 1:
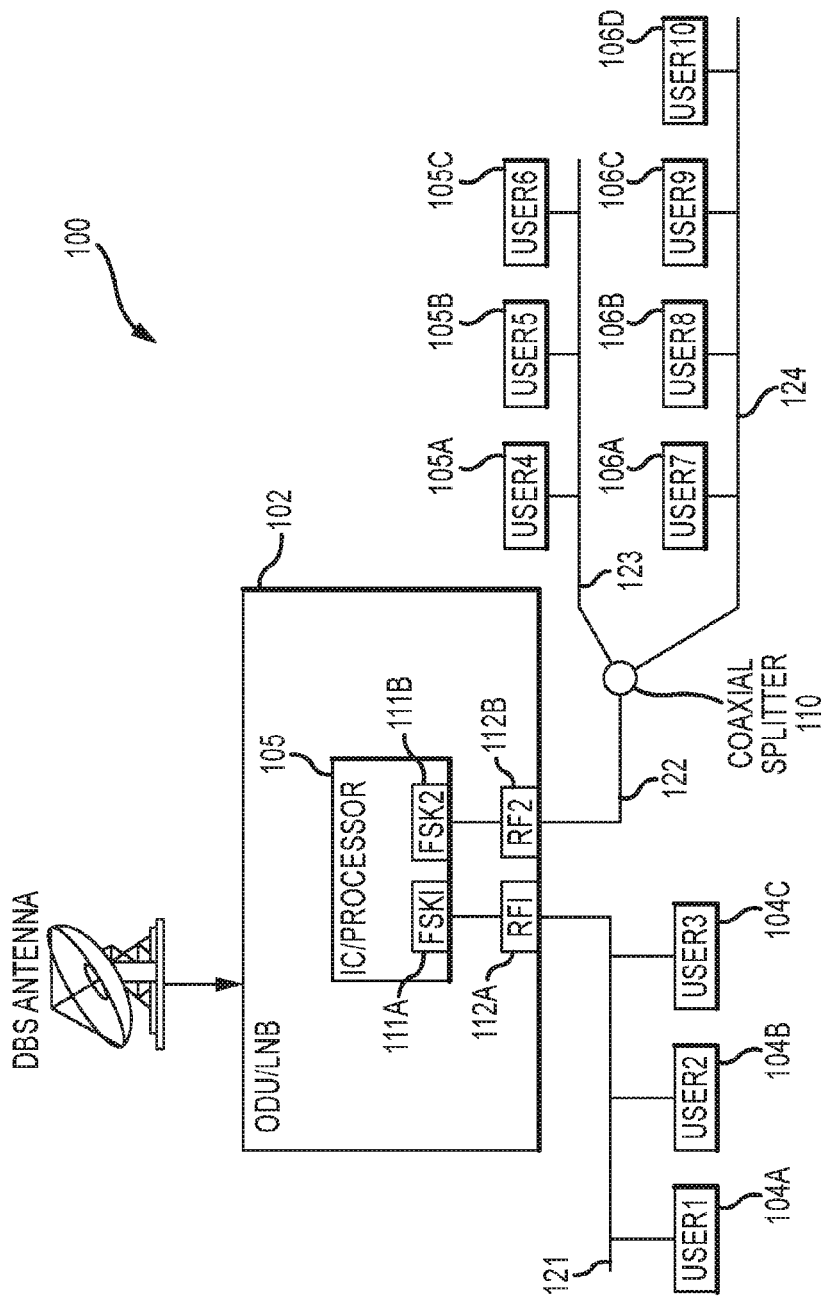

| | | | |
|---|---|---|---|
| 6,507,587 B1* | 1/2003 | Bahl | H04B 7/2656 370/348 |
| 6,868,058 B1 | 3/2005 | Cooper et al. | |
| 2001/0050910 A1 | 12/2001 | Oh | 370/336 |
| 2002/0041585 A1* | 4/2002 | Bahl | H04W 72/0446 370/337 |
| 2002/0105970 A1 | 8/2002 | Shvodian | 370/468 |
| 2010/0106874 A1* | 4/2010 | Dominguez | G06F 13/24 710/260 |
| 2011/0055864 A1* | 3/2011 | Shah | H04N 7/1675 725/31 |
| 2012/0210416 A1* | 8/2012 | Mihelich | H04L 63/0218 726/11 |
| 2012/0254750 A1 | 10/2012 | Chessher | |
| 2013/0208579 A1 | 8/2013 | Strobel et al. | |
| 2013/0272314 A1 | 10/2013 | Kuipers et al. | |
| 2014/0105604 A1 | 4/2014 | Luo et al. | |
| 2014/0133318 A1* | 5/2014 | Kuehner | H04W 4/023 370/252 |
| 2014/0133486 A1* | 5/2014 | Sivasankar | H04L 47/41 370/392 |
| 2014/0369362 A1* | 12/2014 | Chessher | H04J 3/1682 370/449 |
| 2016/0099775 A1* | 4/2016 | Liu | H04B 10/2507 398/115 |
| 2016/0164780 A1* | 6/2016 | Timmons | H04L 45/70 370/238 |

OTHER PUBLICATIONS

European Patent Office, International Search Report and Written Opinion, dated Sep. 29, 2014 for International Application No. PCT/US2014/042072.

* cited by examiner

COMMUNICATION SIGNAL ISOLATION ON A MULTI-PORT DEVICE

PRIORITY CLAIM

This application claims priority to U.S. Provisional Application Ser. No. 62/098,980 filed on Dec. 31, 2014, which is incorporated herein by reference.

TECHNICAL FIELD

The present disclosure generally relates to data communications, and more particularly to systems, devices and techniques for data communications exchanged between a single host and multiple clients. Various embodiments may be implemented in the context of an outdoor unit communicating with multiple television receiver clients in a digital satellite or other television distribution system.

BACKGROUND

Many different data communications techniques have been developed and widely deployed across many different kinds of wired and wireless media. Telephone and data networks, for example, make use of many different types of data communications protocols and techniques. As more complex computing, communication and entertainment systems become increasingly reliant upon interactions between multiple devices, the need for effective data communications continues to increase.

One data communications technique that has seen widespread adoption is time division multiple access (TDMA) encoding. TDMA is a channel access technique that allows several transmitters to share a common wired or wireless channel by assigning each transmitter its own time slot for using the shared channel. TDMA has been widely implemented in mobile telephony, wired and wireless networks, home and industrial controls, and in many other settings.

Challenges can arise in certain settings, however, such as when TDMA or other signals received on multiple communications ports can interfere with each other. Many modern microprocessors, for example, are able to simultaneously communicate on two or more separate ports using separate chip interfaces, device ports and the like. If sufficient care is not taken, signals propagating on the separate channels can cause undesirable electromagnetic interference with each other. Often, engineers attempt to physically isolate the separate communications paths, but this can be a substantial challenge in many settings, especially if the equipment experiencing crosstalk has already been deployed for use.

It is therefore desirable to create systems, device and methods that can reduce interference in multi-port settings while still efficiently and effectively transmitting data. These and other desirable features and characteristics will become apparent from the subsequent detailed description and the appended claims, taken in conjunction with the accompanying drawings and this background section.

BRIEF SUMMARY

Various examples of different embodiments, aspects and features are described in detail below, and these may each be augmented or modified in many different ways.

Automated processes, devices and systems isolate signals received on first and second ports from each other using staggered time division multiple access (TDMA) schemes. Additionally or alternately, port and/or client identifiers can be included within communications propagating in multiple TDMA schemes, thereby allowing host and/or client devices to verify that communications are received on the intended ports. By logically isolating the communications of the multiple TDMA schemes and/or by providing identifying information within propagated communications, crosstalk between the two schemes can be substantially reduced or eliminated, often without substantial modifications to the hardware configuration of the system.

In some embodiments, an automated process is executable by a host device to isolate signals received on first and second ports of the host device from each other. The automated process suitably comprises: establishing, though communications between the host device and at least one first client device operating on a first channel coupled to the first port, a first time division multiple access (TDMA) scheme having a first plurality of timeslots that are assignable to the at least one first client device; and separately establishing, though communications between the host device and at least one second client device operating on a second channel coupled to the first port, a second time division multiple access (TDMA) scheme having a second plurality of timeslots that are assignable to the at least one second client device, wherein the first and the second timeslots are staggered in time with respect to each other so that the first timeslots occur at different times than the second timeslots.

Additionally or alternately, each of the messages transmitted on the first channel can be configured with a first identifier of the first port, and each of the messages transmitted on the second channel can be configured with a second identifier of the second port. These port identifiers can be provided within subsequent communications on each TDMA channel so that host or client devices receiving the messages can verify that the communication is received on the intended channel. Device identifiers could be used in place of or in addition to port identifiers, as desired.

Other embodiments provide client devices, host devices and data processing systems that implement logical TDMA isolation and/or port/device identifiers using software or firmware instructions residing within memory or mass storage and executed by a microprocessor or similar processing circuitry. Host and client devices typically further comprise suitable coaxial, twisted pair, wireless or other physical interfaces for transmitting and receiving communications on the various channels.

These and other example embodiments are described in increasing detail below.

DRAWING FIGURES

Figure 2:
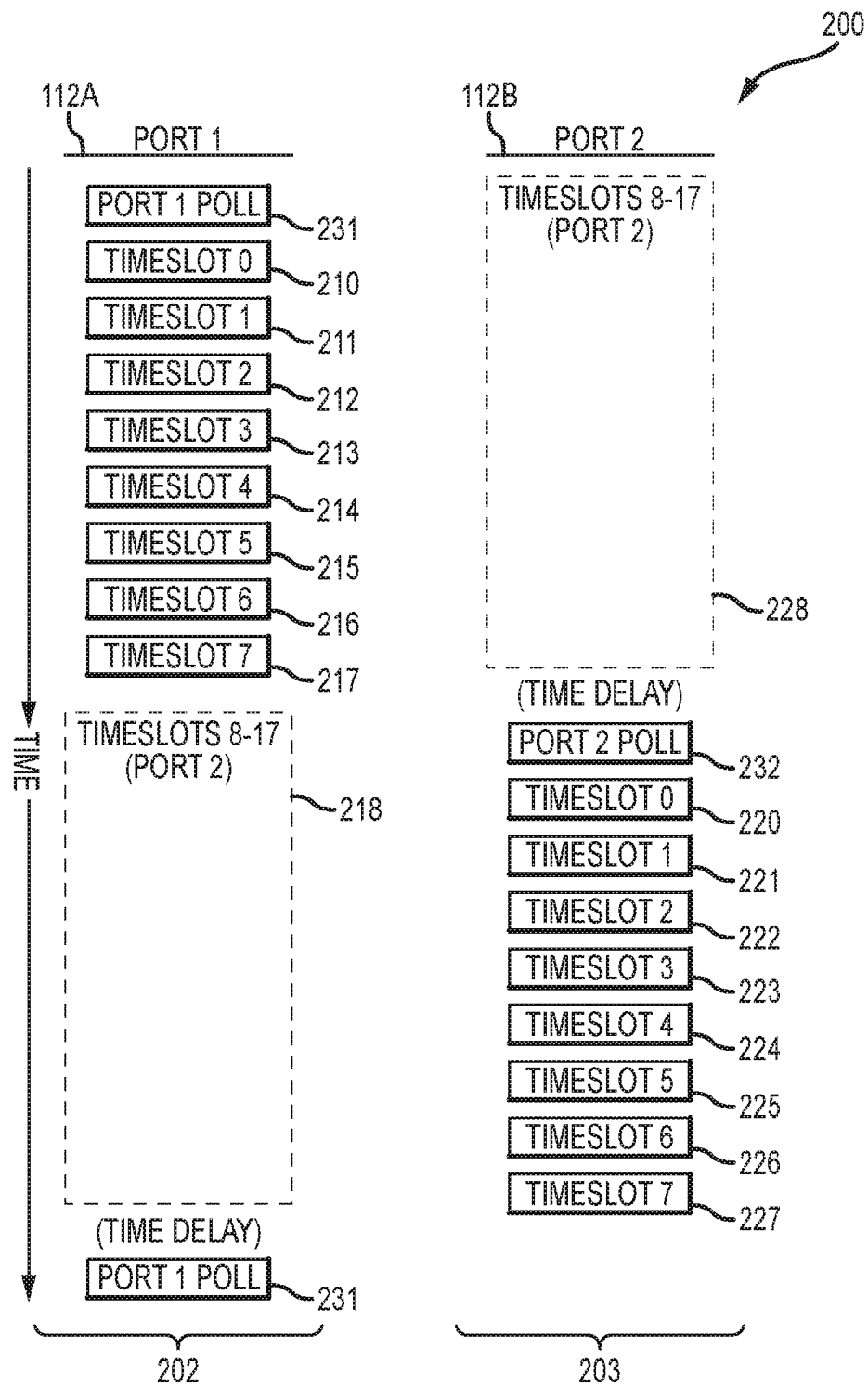
Figure 3:
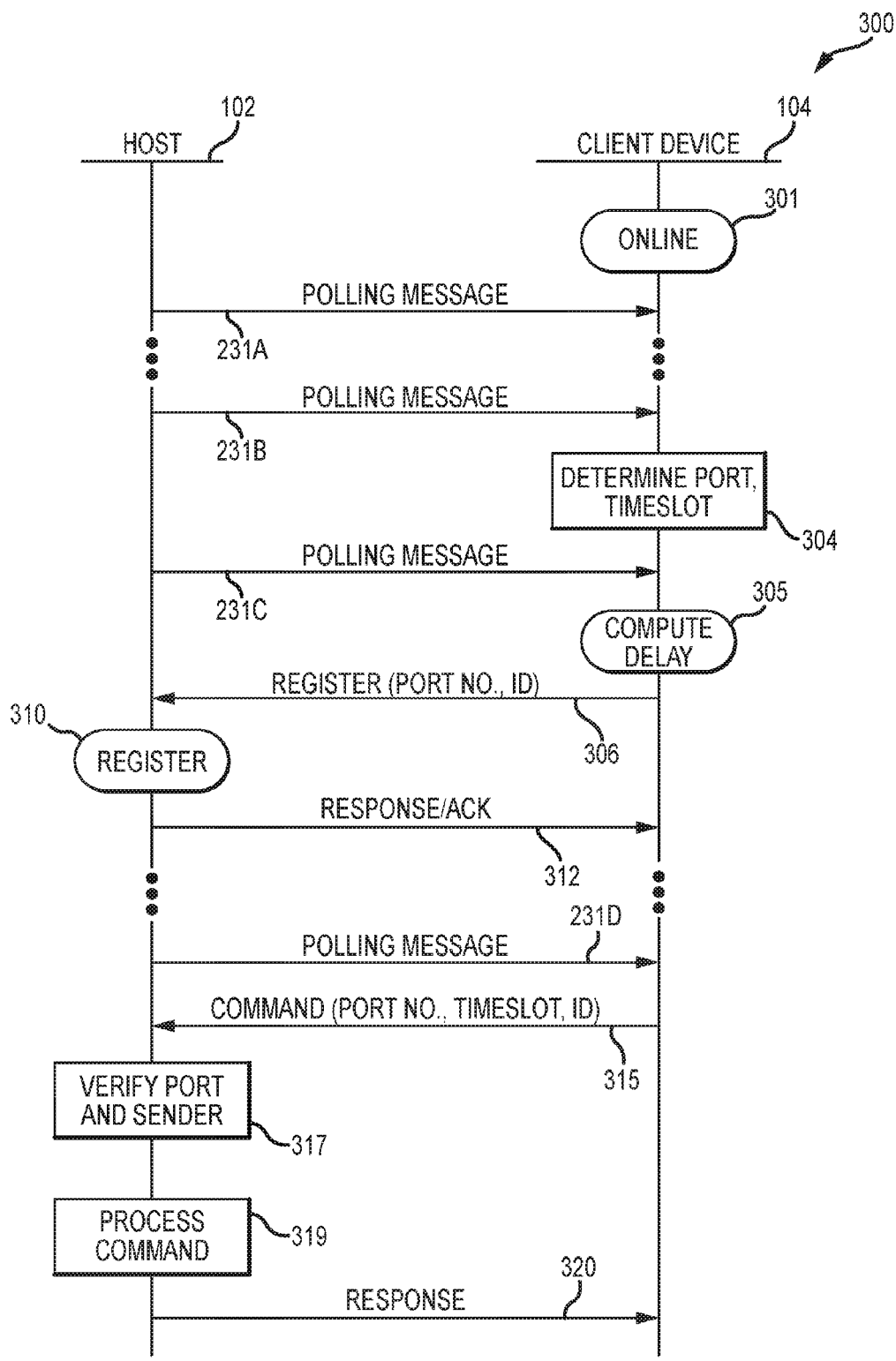

Example embodiments will hereinafter be described in conjunction with the following drawing figures, wherein like numerals denote like elements, and FIG. 1 is a block diagram of an example system that supports multi-port TDMA communications;

FIG. 2 is a diagram of an example timing scheme in which TDMA cycles are staggered to prevent overlapping communications; and FIG. 3 is a data flow diagram showing example processes to communicate in a multi-port TDMA system.

DETAILED DESCRIPTION

The following detailed description of the invention is merely exemplary in nature and is not intended to limit the invention or the application and uses of the invention.

Furthermore, there is no intention to be bound by any theory presented in the preceding background or the following detailed description.

Various embodiments provide processes and systems that efficiently yet effectively reduce crosstalk interference in multi-port communications systems. By properly designing and operating the TDMA scheme, crosstalk interference can be prevented using software, firmware or other control logic, thereby providing a very reliable technique that does not require hardware redesigns or changes to hardware that may already be deployed for operation.

Although the following discussion uses a home-type satellite television distribution system as an illustrative example, equivalent embodiments could be deployed in any communications setting in which a multiport host communicates with a number of clients over a shared wireless or wired communications channel. Such settings could include, without limitation: wireless or wired telephony systems; sensing or control systems; home or commercial entertainment systems; aerospace, automotive or other vehicle controls; and/or any other communications systems as desired.

Turning now to the drawing figures and with initial reference to FIG. 1, an example communications system 100 suitably includes a host device 102 that communicates with any number of client devices 104, 105, 106 via one or more shared communications channels. In the example of FIG. 1, host 102 is an outdoor unit (ODU) or low noise block (LNB) associated with a digital broadcast satellite (DBS) television receiver system, although other embodiments could be equivalently applied to other settings and applications. Host 102 may be any sort of computer system, consumer electronics device, in-home controller or other electronic component that is capable of communicating with two or more client devices 104, 105, 106. In a typical setting, the host 102 and clients 104-106 communicate using a time domain multiple access (TDMA) multiplexing scheme in which time is allocated to the different devices communicating within the system 100 so that each has a specific time to communicate. One example of an adaptive multi-client single-host TDMA communications system is described in US Patent Publication No. 2014/0369362, which is incorporated herein by reference; other TDMA schemes use static allocation of timeslots to share communications bandwidth and to avoid data collisions within the channel. When multiple TDMA schemes operate within a host 102 or other device, however, there is a potential for undesirable crosstalk or other interference between the different TDMA schemes.

In the example of FIG. 1, host 102 includes a microprocessor or other integrated circuit (IC) with two (or more) frequency shift key (FSK) modems 111A-B used to communicate on two (or more) ports 112A-B. These ports may, for example, connect to coaxial cables, wireless channels or other communication media that can be used to transmit television signals and/or command signals between the host 102 and any number of receiver clients 104, 105, 106. In the FIG. 1 example, the receivers 104, 105, 106 are set top boxes (STBs) or other television receivers, although other embodiments may incorporate different types of receivers and/or completely different devices and modes of communication, as desired. Host 102 and client devices 104-106 may vary from embodiment to embodiment, but will typically be implemented using any conventional computing circuitry, including microprocessors, memory, input/output interfaces and the like. Both host 102 and client devices 104-106 will typically implement the various functions described herein using software, firmware or similar logic that resides in memory or mass storage and that is executed by a general or special purpose microprocessor residing within the device.

Communications may be propagated within system 100 in any manner. In the example embodiment described herein, each cable 121, 122 that connects to ports 112A-B may be configured for a TDMA scheme that supports some number of concurrent users exclusively on a single primary conductor 121 or 122, and/or a different number of concurrent users on multiple primary conductors 121 and 122. These numbers are defined as part of a TDMA or other multiplexing scheme based upon the particular application and environment. In an in-home DBS television distribution system, for example, system 100 may be capable of supporting eighteen or so users on a single primary conductor 121 or 122, whereas multi-port implementations could support only eight or so users on each primary conductor 121 or 122. In the example of FIG. 1, two separate channels are shown operating on separate cables 121 and 122 attached to ports 112A and 112B, respectively. In some embodiments, conductors may be further sub-divided. FIG. 1, for example, shows that cable 122 may be split (using a conventional coaxial splitter 110, such as a splitter that provides proper impedance matching for radio frequency (RF) and/or frequency shift keying (FSK) signals) to connect to two sub-cables 123, 124 for convenience. Other embodiments may support different numbers of client devices 104-106 using any number of different cables or other media (including wireless media) that are arranged in any desired manner.

In an example television content distribution system, each user device 104, 105, 106 uses a time slot in a TDMA scheme to transmit and/or receive control data to the host device 102. This control data may be used for any purposes, such as to obtain different content (e.g., different channels or satellite transponder signals) or the like. Each client device 104, 105, 106 typically receives television content from the host 102 on an assigned frequency to support simultaneous transmission using frequency domain multiplexing (FDM) across the same physical carriers 121-124 used to carry the control signals. These assigned frequencies may be allocated to the various client devices using the control schemes described herein, as desired.

As briefly noted above, cross-talk interference can arise between the two ports 112A-B. That is, it can be possible for electromagnetic signals intended for receipt on one modem 111A-B to propagate on an undesired signal path until they are received at the other modem 111A-B. To that end, it is desirable to isolate the signals that are received at each modem 112A, 112B from the signals that are received at the other port. In previous implementations, signals would typically be physically isolated from each other through redesign of physical layouts, insertion of electrically insulating materials, and/or the like. Another way to isolate signals intended for the multiple modems 112A-B, however, is to logically isolate the signals by staggering the TDMA time slots between the two modems 111A-B, thereby preventing simultaneous communication on the two separate channels that could otherwise cause communications disruptions. Another way to address crosstalk interference is to add a digital port or device identifier to communications packets transmitted within system 100 and to verify the identifiers in received messages to ensure that communications received on a particular modem 111A-B are intended for that particular port 112. These two techniques, each of which is described in detail herein, may be deployed independently or concurrently with each other to prevent and/or identify any crosstalk interference without regard to the physical arrangement of the IC 105, modems 111A-B, ports 112A-B, cables 121, 122, 125 and/or any other hardware.

FIG. 2 shows a timing diagram of an example embodiment in TDMA cycles 202, 203 are processed simultaneously on two separate ports 112A, 112B for time efficiency, yet timeslots allocated on each port 112A-B are staggered to prevent crosstalk between ports 112. As shown in FIG. 2, two 18-slot TDMA cycles 202, 203 can be staggered with respect to each other and active timeslots 210-217, 220-227 (respectively) can be assigned to prevent data collisions even if crosstalk were to occur. The timing and control of FIG. 2 could be implemented in software or firmware logic executed by host 102 and by each client device 104, 105, 106, as appropriate.

In the example shown in FIG. 2, each TDMA cycle 202, 203 begins with a polling message 231, 232 transmitted by host 102. The polling message may be formatted in any manner, but in various embodiments the polling messages 231, 232 will indicate the port number on which the message is transmitted and any timeslots in the TDMA cycle that may be available for devices coming online. Again, the available timeslots can be limited to those slots that will not overlap with active timeslots that are assignable on another port 112.

In various embodiments, client devices 104-106 are previously programmed or otherwise configured to recognize a particular timeslot width, so each client device is able to determine the relative times of timeslot within the TDMA scheme as a determined delay from the polling message 231, 232. One embodiment that supports two ports 112A-B with up to eight devices 104-106 each, for example, could assign timeslots to be about 8 msec each, with a designed delay between cycles of about the same time. In this example, each cycle 202, 203 would last about 160 msec (including the delay between consecutive cycles), with the two cycles 202, 203 staggered about 80 msec apart. Polling messages 231 and 232 may be transmitted on any regular or irregular basis, however, and it is not necessary that polling or timeslots on the two channels be synchronized in every embodiment. In other embodiments, host 102 could delay either or both cycles 202, 203 for any regular or irregular duration while still ensuring that active timeslots 210-217, 220-227 of each cycle occur during the inactive timeslots 218, 228 of the other cycle as desired. The available timeslots 210-217 and 220-227 do not necessarily need to be assigned contiguously; available timeslots could be partially or otherwise interleaved between schemes 202 and 203 if desired.

FIG. 3 shows an example process 300 by which a client device 104 enters a TDMA scheme 202 to communicate with host 102. Although process 300 is illustrated with respect to only one client device 104 for clarity, in practice process 300 would typically be implemented with respect to each of the client devices 104-106 operating within system 100 so that each client device 104-106 is able to enter the system 100 and to communicate effectively with host 102 without introducing cross-talk or other interference with other devices. Similarly, each TDMA scheme 202, 203 would typically operate somewhat independently to assign and release timeslots. Once again, however, some coordination between the two schemes 202, 203 to implement staggered relative timing as described above may be desirable in many implementations.

FIG. 3 begins with a new client device 104 coming online (function 301) and desiring to communicate with host 102 using the TDMA scheme 202. In practice, assignment or re-assignment of timeslots may take place on any regular or irregular basis, or in response to any other events. If host 102 is rebooted, for example, then each client device 104-106 in system 100 will typically need to reconnect and new TDMA schemes 202, 203 will be set up. If any client 104-106 becomes non-responsive after any appropriate period of time (e.g., minutes or hours), host 102 may release an assigned timeslot, thereby necessitating that the missing client 104 reconnect for further communication. Other embodiments may set other conditions leading to timeslot allocation by one or more clients 104 as desired.

If a client 104 coupled to a communications channel 121 does not already have an assigned timeslot in the TDMA scheme 202 associated with that port 112, then the client 104 delays until at least one polling message 231A is received. As indicated above, polling messages 231 will typically identify the relevant port number (e.g., port 112A in this example), as well as the timeslots 210-217 that remain unassigned and available for use. These timeslots 210-217 will typically be limited to those timeslots that do not overlap in time with active timeslots 220-227 of the other TDMA scheme 203, as described above.

Client device 104 determines its port number and timeslot in any manner (function 304). In various embodiments, client 104 delays this determination until two or more polling messages 231A-B are received to increase the likelihood that the received messages 231 are intended for transmission on that channel 121 and are not the result of crosstalk between channels 121 and 122. If the port number is the same between both polling messages 231A-B, then the client device 104 can be confident that this is the correct port number. If the information in the two consecutive polling messages 231A-B differs, however, then the client device 104 could delay in joining the system 100 until enough messages 231 are received to be confident that the client 104 is joining the proper TDMA scheme 202. In other embodiments, the client 104 reacts to differences between the received polling messages 231 by selecting the port number contained in the stronger polling messages 231 (e.g., the message with the greatest signal power). Other embodiments may react to conflicts in any other manner.

As noted above, polling messages 231 transmitted by host 102 will contain timing information sufficient for client device 104 to obtain a useable timeslot within the appropriate TDMA scheme 202. This timing information may contain, in various embodiments, an identification of available slots. If the client device 104 is programmed with pre-existing information regarding the time characteristics of the TDMA scheme 202 (e.g., timeslot width, known delay times, etc.), then the timeslot number may be sufficient for the client 104 to compute appropriate transmit times. In other embodiments where slot duration or other timing parameters may be variable or unknown, then each polling message 231 will typically include such information to enable client devices 104-106 to compute transmit times in any suitable manner.

Continuing with function 304 in FIG. 3, client device 104 selects a timeslot in any manner. In various embodiments, the device 104 randomly selects from amongst the available timeslots; other embodiments may choose a timeslot by serially selecting the first (or last) available timeslot, the timeslot used during the last connection to the host 102, or in any other manner. If two client devices 104 come online at the same time (e.g., following a power outage) and happen to choose the same timeslot, collisions may be detected and responded to by host 102, or the clients 104 may simply recognize that timeslot allocation was unsuccessful and try again using the same or a different slot.

In various embodiments, the frequency used to receive data from host 102 may be determined in relation to the timeslot that is selected by the client device 104. For example, the timeslot may correspond to a multiple of an offset frequency that is added to a carrier frequency to arrive at the correct receive frequency associated with that timeslot. In other embodiments, frequency allocation may be separated from timeslot allocation or otherwise implemented in any other manner.

After selecting a timeslot, the client device 104 awaits a subsequent polling message 231C from host 102, computes the appropriate delay (function 305), and transmits a registration message 306 back to the host 102 during the selected timeslot. As mentioned above, delay may be computed based upon pre-determined data in conjunction with the selected timeslot number, or based upon information provided in the polling message. If the client device 104 is pre-programmed to know that each timeslot is 8 msec or so in duration, for example, and the client device 104 selects the third timeslot (corresponding to timeslot 212 in FIG. 2), then the client 104 would wait for 24 msec (e.g., from the start of the poll message 231) before transmitting the response message. Other embodiments could assign timing values in any other manner.

The registration message 306 sent from client device 104 will typically include an indication of the port number obtained from the polling message 231 as well as an identifier that identifies the particular host device 104 attempting to join the system 202. In various embodiments, the device identifier may be a unique device ID of any length (e.g., about four bytes in one example) that is assigned to the device 104 when it is manufactured or otherwise configured prior to shipment to the customer. Such identifiers will uniquely identify any client device 104 without duplication; other embodiments could use other types of identifiers as desired.

Upon receipt of a registration message 306 on a timeslot, host 102 will process the message 306 (function 310) to register the newly-entering client 104 in the TDMA scheme 202. Registration will typically include entering the device ID contained within the message 306 in a table or database. Registration may also involve creating a "shorthand identifier", such as a one or two byte identifier, that can be provided to the registering client 104 in a response message 312 for use in subsequent communications. At a minimum, the shorthand identifier would typically identify the registered time slot and port number associated with 112A-B in some embodiments. The shorthand identifier could also identify particular tuners or other components of client device 104 such that each client device 104 may have multiple identifiers relating to multiple video streams or other interactions with host 102. Client devices 104 could alternately verify that their registration was completed by checking subsequent polling messages 231 to verify that the selected timeslot has been assigned by host 102 and is not available for use by other clients 104-106, although response 312 would provide a more reliable confirmation in most implementations.

During subsequent operation, client 104 uses the assigned timeslot by waiting for a polling message 231D, computing the appropriate delay time, and transmitting command messages 315 at the assigned time. In various embodiments, command messages 315 will include the port number and/or the device identifier described above. The device identifier may not be the full factory-assigned ID, but rather the shorter identifier associated with the device (or any of its tuners) at host 102.

Upon receipt of a command message 315 on an assigned timeslot, then, the host 102 is able to parse the command message 315 to verify that the port number and/or the transmitting client device 104 are as expected (function 317). If a message 315 is received at an unexpected time or with an unexpected port number, the message 315 can be discarded to prevent misuse of bandwidth, or processed in any other manner. Various embodiments could log or otherwise monitor incidents of potential crosstalk for troubleshooting, error reporting or other purposes, as desired.

If the command message 315 is verified based upon the port number, sender identifier and/or other information, then the host 102 will execute the requested command (function 319). If the command requests a channel or transponder change, for example, the host 102 can execute the requested change and update a video stream or other output. Moreover, an acknowledgement or reply message 320 can be provided back to client device 104, as appropriate.

FIG. 3 shows various functions of processes 300 that could be carried out by software, firmware and/or other programmed logic residing in memory and executed by a processor within host 102 and/or client device 104. Messages communicated between host 102 and client device 104 will typically be transmitted and received via coaxial, twisted pair, wireless or other interfaces included within host 102 and device 104, as appropriate. Other embodiments may be implemented using any equivalent data processing hardware or other structures, as desired.

According to various embodiments, then, a multi-port TDMA communications system 100 can be designed to be relatively immune to crosstalk interference between the multiple TDMA channels 202, 203. Timeslots can be assigned between the multiple channels 202, 203 so that active slots of one channel occur during inactive slots of the other channel. Moreover, port numbers and/or device identifiers can be included within command messages 315 and cross-checked against expected values to ensure that received messages are valid and not the result of interference or other undesired effects.

The foregoing discussion therefore considers various systems, devices and methods to provide communications between a host and one or more clients. As noted at the outset, the general concepts set forth herein may be adapted to any number of equivalent embodiments. Although the discussion herein frequently considers the communications channel to be a coaxial cable used to transmit data in a DBS television system, for example, equivalent concepts could be applied to other cable-based or wireless media, or to any other applications (including telephony, sensing and control, or the like). Many other enhancements, modifications and other changes could be made in a wide array of alternate but equivalent embodiments.

The term "exemplary" is used herein to represent one example, instance or illustration that may have any number of alternates. Any implementation described herein as exemplary is not necessarily to be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of elements described without departing from the scope of the claims and their legal equivalents.

What is claimed is:

1. An automated process executable by a host device to isolate signals received on first and second ports of the host device from each other, the automated process comprising:
   establishing, through communications between the host device and at least one first client device operating on a first channel coupled to the first port, a first time division multiple access (TDMA) scheme having a first plurality of timeslots that are assignable to the at least one first client device; and
   separately establishing, through communications between the host device and at least one second client device operating on a second channel coupled to the first port, a second time division multiple access (TDMA) scheme separate from the first TDMA scheme, the second TDMA scheme having a second plurality of timeslots that are assignable to the at least one second client device, wherein the first timeslots of the first TDMA scheme are staggered in time to occur at different times than the second timeslots of the second TDMA scheme.

2. The automated process of claim 1 wherein each of the messages transmitted on the first channel comprises a first identifier of the first port, and wherein each of the messages transmitted on the second channel comprises a second identifier of the second port.

3. The automated process of claim 2 further comprising the host verifying the first and second identifiers in each of the messages transmitted on the first and second channels to confirm that the message is received on the correct port number.

4. The automated process of claim 1 wherein the first and the second TDMA schemes are initiated by the host transmitting first and second polling messages, respectively, on the first and second channels.

5. The automated process of claim 4 wherein the first polling message comprises a first identifier of the first port, and the second polling message comprises a second identifier of the second port.

6. The automated process of claim 5 each of the messages transmitted by the at least one first client device on the first channel comprises the first identifier of the first port obtained from the first polling message, and wherein each of the messages transmitted by the at least one second client device on the second channel comprises the second identifier of the second port obtained from the second polling message, wherein the automated process further comprises the host verifying the first and second identifiers in each of the messages transmitted on the first and second channels to confirm that the messages are received on the correct port numbers.

7. The automated process of claim 1 wherein the first and the second TDMA schemes are initiated by the host transmitting first and second polling messages, respectively, on the first and second channels, wherein the first and second polling messages indicate available timeslots within the first and second TDMA schemes, respectively, and wherein client devices entering the first or second TDMA schemes are configured to initially select one of the available timeslots indicated by the first or second polling messages, respectively.

8. The automated process of claim 1 wherein the first and second TDMA schemes overlap in time, but communications in the first TDMA scheme and communications in the second TDMA scheme do not occur at the same time.

9. The automated process of claim 1 wherein each of the messages transmitted by the at least one first and second devices on the first and second channels, respectively, comprises device identifiers that identify the at least one first or second client device that transmitted the message.

10. The automated process of claim 9 further comprising the host verifying the device identifiers in each of the messages received on the first and second channels to confirm that the messages are received on the correct ports.

11. A host device comprising an integrated circuit having a first modem coupled to a first port of the host device and a second modem coupled to a second port of the host device, wherein the integrated circuit is configured to execute an automated process to isolate signals received on first and second ports of the host device from each other, the automated process comprising:
   establishing, through communications between the host device and at least one first client device operating on a first channel coupled to the first port, a first time division multiple access (TDMA) scheme having a first plurality of timeslots that are assignable to the at least one first client device; and
   separately establishing, through communications between the host device and at least one second client device operating on a second channel coupled to the first port, a second time division multiple access (TDMA) scheme separate from the first TDMA scheme, the second TDMA scheme having a second plurality of timeslots that are assignable to the at least one second client device, wherein the first timeslots of the first TDMA scheme are staggered in time to occur at different times than the second timeslots of the second TDMA scheme.

12. The host device of claim 11 wherein each of the messages transmitted on the first channel comprises a first identifier of the first port, and wherein each of the messages transmitted on the second channel comprises a second identifier of the second port, and wherein the process further comprises the host verifying the first and second identifiers in each of the messages transmitted on the first and second channels to confirm that the message is received on the correct port number.

13. The host device of claim 11 wherein the first and the second TDMA schemes are initiated by the host transmitting first and second polling messages, respectively, on the first and second channels, wherein the first polling message comprises a first identifier of the first port, and the second polling message comprises a second identifier of the second port, and wherein each of the messages transmitted by the at least one first client device on the first channel comprises the first identifier of the first port obtained from the first polling message, and wherein each of the messages transmitted by the at least one second client device on the second channel comprises the second identifier of the second port obtained from the second polling message, wherein the automated process further comprises the host verifying the first and second identifiers in each of the messages transmitted on the first and second channels to confirm that the messages are received on the correct port numbers.

14. The host device of claim 11 wherein the first and the second TDMA schemes are initiated by the host transmitting first and second polling messages, respectively, on the first and second channels, wherein the first and second polling messages indicate available timeslots within the first and second TDMA schemes, respectively, and wherein client devices entering the first or second TDMA schemes are configured to initially select one of the available timeslots indicated by the first or second polling messages, respectively.

15. The host device of claim 11 wherein the first and second TDMA schemes overlap in time, but communications in the first TDMA scheme and communications in the second TDMA scheme do not occur at the same time.

16. The host device of claim 11 wherein each of the messages transmitted by the at least one first and second devices on the first and second channels, respectively, comprises device identifiers that identify the at least one first or second client device that transmitted the message, and wherein the process further comprises the host verifying the device identifiers in each of the messages received on the first and second channels to thereby confirm that the messages are received on the correct ports.

17. The host device of claim 11 wherein the host device is an outdoor unit and wherein the at least one first and second client devices are television receivers of a digital broadcast satellite television distribution system.

18. The host device of claim 11 wherein the first and second channels are carried by separate physical carriers coupled to the first and second ports, respectively, of the host device.

19. The host device of claim 11 wherein the first and second channels are carried by separate cables coupled to the first and second ports, respectively, of the host device.

\* \* \* \* \*